United States Patent [19]

Nee

[11] Patent Number: 5,272,431
[45] Date of Patent: Dec. 21, 1993

[54] AUTOMATIC POWER CONNECTOR FOR RECHARGING ELECTRIC VEHICLES

[76] Inventor: Patrick W. Nee, 96 Walter St., Roslindale, Mass. 02131

[21] Appl. No.: 800,187

[22] Filed: Nov. 27, 1991

[51] Int. Cl.$^5$ .............................................. H02J 7/00
[52] U.S. Cl. ......................................... 320/2; 320/5; 320/56
[58] Field of Search ........................... 320/2, 5, 8, 56; 307/10.7; 180/65.1, 65.2, 65.3

[56] References Cited

U.S. PATENT DOCUMENTS

| | | | |
|---|---|---|---|
| 3,169,733 | 2/1965 | Barrett, Jr. | 246/30 |
| 4,158,802 | 6/1979 | Rose, II | 320/2 |
| 4,184,580 | 1/1980 | Ellis, Jr. | 320/2 X |
| 4,347,472 | 6/1982 | Lemelson | 320/2 |
| 4,496,896 | 1/1985 | Melocik et al. | 320/2 |
| 4,532,418 | 7/1985 | Meese et al. | 320/2 X |
| 4,777,416 | 10/1988 | George, II et al. | 318/568 |
| 4,800,328 | 1/1989 | Bolger et al. | 320/2 |
| 5,045,769 | 9/1991 | Everett et al. | 320/2 |
| 5,049,802 | 9/1991 | Mintus et al. | 320/2 |
| 5,157,319 | 10/1992 | Klontz et al. | 320/2 |

FOREIGN PATENT DOCUMENTS

| | | | |
|---|---|---|---|
| 2659817 | 3/1978 | Fed. Rep. of Germany | 320/2 |
| 0036114 | 3/1980 | Japan | 320/2 |
| 0201719 | 12/1982 | Japan | 320/2 |
| 0080103 | 5/1984 | Japan | 320/5 |
| 0648520 | 3/1985 | Switzerland | 320/5 |

OTHER PUBLICATIONS

"Power Supply for Automatic Guided Vehicle Systems", Marketing Brochure, Hoppecke Batteries (Apr. 1991).
Frank, L., et al., "Electric Vehicles Only," Popular Science (May 1991), pp. 76–110.
Wald, M. W., "Cars that Whirrr and Burn Rubber," The New York Times (Feb. 2, 1992), p. 10F.

*Primary Examiner*—Kristine L. Peckman
*Attorney, Agent, or Firm*—Hamilton, Brook, Smith & Reynolds

[57] ABSTRACT

The invention supplies electricity to a recharger used to recharge batteries in a battery-powered vehicle. An arm mechanism is attached to the vehicle and moveable relative to the vehicle. At the distal end of the arm is an electrical plug protected by a retractable sheath and electrically connected to the recharger. A docking station located remote from the vehicle, emitting light and containing a conical passageway for guiding the plug to the outlet. A docker attached to the vehicle, containing optical sensors tuned to the light emitted by the docking station. Software instructions move the arm mechanism to seek the outlet, calculate the position of the outlet, and move the arm mechanism to connect the plug to the outlet. Software instructions activate the electrical supply to the outlet if the vehicle is authorized to receive electricity.

51 Claims, 6 Drawing Sheets

AUTOMATIC POWER CONNECTOR FOR RECHARGING ELECTRIC VEHICLES

BACKGROUND OF THE INVENTION

The electric vehicle is regaining popularity. Because of pollution from the combustion engine, federal and state governments are seeking alternative power systems for the automobile and other vehicles. One of the leading candidates is the battery-powered vehicle, which utilizes electricity stored in batteries.

Although battery-powered vehicles are clean, quiet and efficient, they face a number of obstacles to acceptance. One obstacle is the short time-life of the vehicle's charged batteries. While there have been advances in power storage and charge duration, the time-life cycle of a battery-based vehicle is only about two hours. Therefore, a battery-powered vehicle cannot go for more than two hours without recharging. Another obstacle to acceptance is the inconvenience to the user in having to continually plug into a power source.

Because of the batteries short time-life the driver needs to manually plug and unplug the vehicle every time it is used. If the driver fails to plug in the vehicle, then the driver may find the car insufficiently recharged for the next use. This practical issue of everyday use must be answered, if there is to be any significant widespread use of the electric automobile.

SUMMARY OF THE INVENTION

The invention supplies an in-vehicle electrical device with electricity from an off-vehicle power supply. The electrical device is connected to an in-vehicle electrical plug. The power supply comprises an electrical outlet supplying the off-vehicle power and an indicator for indicating the outlet's location. Also attached to the vehicle is a locator for automatically seeking and locating the outlet based on signals detected from the indicator and then connecting the plug to the outlet.

The invention supplies electricity to a recharger used to recharge batteries in a battery-powered vehicle. An arm mechanism is attached to the vehicle and moveable relative to the vehicle. At the distal end of the arm is an electrical plug protected by a retractable sheath and electrically connected to the recharger. While not in use, the arm and plug are retracted to a secure position. A docking station is located remote from the vehicle. The docking station contains an electrical outlet electrically connected to an electrical power supply. The docking station emits light distinguishable from background light and contains a conical passageway, which leads from the face of the docking station to the outlet for guiding the plug to the outlet. A docker is attached to the vehicle and is in electrical communication with the arm mechanism. The docker contains optical sensors tuned to the light emitted by the docking station. Software instructions move the arm mechanism to seek the outlet, calculate the position of the outlet, move the arm mechanism to connect the plug to the outlet, and establishes a communication link with the docking station. A power controller remote from the vehicle is in electrical communication with the docking station. The power controller contains an authorizer for establishing a communication link with the docker and determining whether the vehicle is approved for receiving electricity, an activator controlling the power supplied to the outlet, and a meter and accounter for measuring the energy used by the vehicle for billing purposes.

DESCRIPTION OF THE PREFERRED EMBODIMENT

Figure 1:
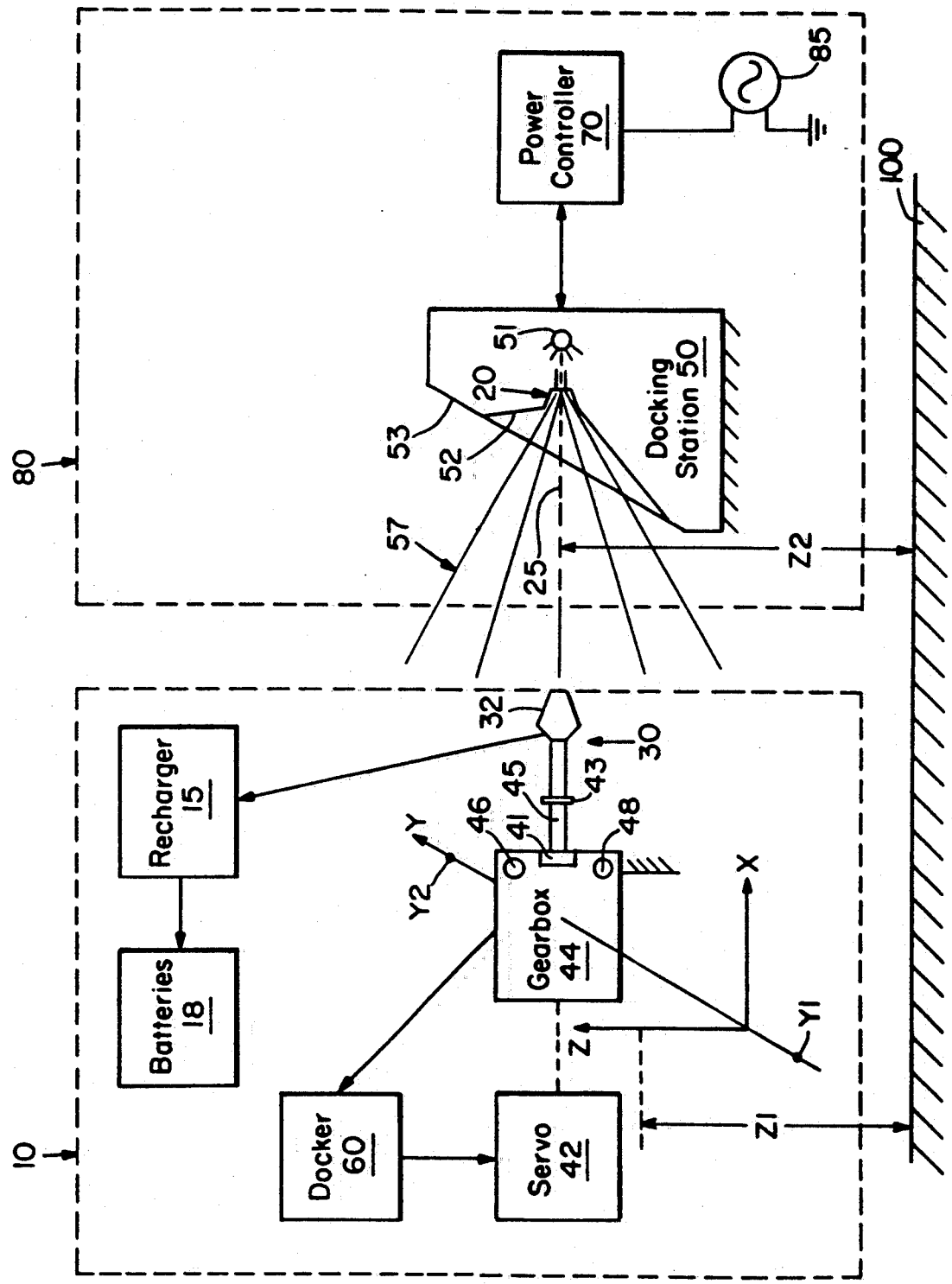
FIG. 1 is a block diagram of a preferred embodiment of the invention.

In the preferred embodiment shown in FIG. 1, a battery-powered vehicle 10 is equipped with an in-vehicle recharger 15 for recharging the batteries 18. The vehicle's recharger converts household level, 115 V, alternating current (AC) to the appropriate direct current (DC) necessary to recharge that particular vehicle's batteries. The recharger 15 may be preinstalled by the vehicle manufacturer or the recharger 15 may be an aftermarket add-on. The preferred embodiment of the present invention automatically connects the in-vehicle recharger 15 to an off-vehicle AC power supply 80.

The off-vehicle power supply 80 consists of an AC power source 85, a power controller 70, and a docking station 50. The power source 85 generates the household level, 115 V, AC electricity used by the off-vehicle power supply. The use of 115 VAC electricity is preferred in this embodiment to take advantage of existing in-vehicle recharging systems and to promote use of the invention. The power controller 70, as explained in detail below, is responsible for controlling the power connection to the docking station 50. The docking station 50 is preferably stationary and contains an electrical connector outlet 20.

The non-vertically faced docking station 50 shown in FIG. 1 is a preferred embodiment. Although the docking station face 53 is shown to be non-vertical, the face 53 may be configured at any suitable angle, including vertically. Leading inward from the face 53 to the outlet 20 is a substantially conical or concave passageway 52. The passageway 52 aids in guiding the connection between the plug 30 and the outlet 20 by physically funneling the plug 30 toward the outlet 20. Thus, the passageway 52 corrects errors in alignment between the plug 30 and outlet 20.

In the preferred embodiment, the docking station 50 is configured similar to a curb in appearance. In the curb configuration, the center axis 25 of outlet 20 is located approximately a distance Z2 above the road surface 100. By locating the outlet 20 at a known vertical position, the process of locating the outlet 20 is simplified. In addition, the docking station 50 emits a homing beacon 57 to aid the location process. In the preferred embodiment, the homing beacon 57 is visible light generated by a suitable light source such as LED 51, which is mounted within the outlet 20. To reduce the possibility of damage to the LED 51, the LED 51 is mounted on the side of the outlet 20 away from the docking station face 53 with the homing beacon 57 projected through the plug opening. The use of visible light has an additional benefit in allowing the vehicle operator to quickly locate docking stations, especially at night. To limit human and machine confusion between the homing beacon 57 and other light sources (e.g. headlights, sunsets, and reflections), the LED 51 generates a known frequency response. Preferably, the LED 51 emits light from the blue end of the visible light spectrum. As a further visual aid, the homing beacon 57 is energized only when the power controller 70 is operable.

The in-vehicle components are depicted within the dashed line representing the vehicle 10. A servo motor 42 drives gearbox 44 in response to commands issued by docker 60. Attached to the gearbox 44 is a mechanical arm 45 with a male plug 30 attached to the distal end of the arm 45 opposite the gearbox 44 by means of a retaining collar 43 or other suitable means.

The gearbox 44 allows movement of the plug 30 along three axis, the Y-axis running parallel to the nearest edge of the vehicle 10, the X-axis running perpendicular to the nearest edge of the vehicle 10, and the Z-axis running vertically. During vehicle operation or when no recharging is occurring, the gearbox 44 stores the plug 30 in a single secure location, preferably at one extreme along the Y-axis, Y1, and at a height, Z1, above the road surface 100. The secure location protects delicate in-vehicle components from road hazards.

To recharge the batteries, the docker 60 needs to locate the docking station 50 and connect the plug 30 to the outlet 20. Servo motor 42 causes the gearbox 44 to lower the arm 45 and plug 30 to a position, Z2, above the road surface 100. That is, the arm 45 and plug 30 are aligned parallel to the road surface 100 at a vertical distance, Z2, equal to the vertical distance of the outlet 20 above the road surface 100. The servo motor 42 then moves the gearbox 44 and, thus, plug 30 along the Y-axis. While the gearbox 44 is in motion, photodetectors 46,48 positioned on the gearbox 44 scan for an indicator signal (i.e. the LED light 57) from LED 51 in the docking station 50 and communicate any detections to docker 60.

If the docker 60 does not detect the homing beacon 57 before the gearbox 44 reaches the far reach along the Y-axis, Y2, then the docker 60 instructs the servo motor 42 to stop movement. The docker then instructs the servo motor 42 to move the plug 30 and arm 45 in the X-Z plane such that the photodetectors 46,48 are tilted 45 degrees toward the road surface. In this orientation, the photodetectors 46,48 can also detect a docking station 50 not conforming to the preferred curb configuration embodiment. The docker 60 next instructs the servo motor 42 to reverse the gearbox's 44 motion along the Y-axis. If the docker 60 fails to detect the homing beacon before the gearbox 44 returns to the initial position along the Y-axis, Y1, then the docker 60 commands the servo motor 42 to return the plug 30 to the secure position.

If the docker 60 detects the docking station's homing beacon 57, then the docker 60 stops the servo motor 42 from moving the gearbox 44 further along the Y-axis. The docker 60 analyzes the signal from the homing beacon 57 and commands the gearbox 44 to adjust the angle of arm 45 in the X-Y and X-Z planes until the arm 45 and plug 30 are aligned directly opposite the homing beacon. In addition to azimuth adjustments, motion in the X-Y plane may require movement of the gearbox 44 along the Y-axis. From this aligned position, the docker 60 instructs the gearbox 44 to extend the arm 45 toward the homing beacon. The gearbox 44 is gimbal mounted such that physical contact between the 30 and the docking station passageway 52 causes the gearbox 44 to move within the physical constraints imposed by passageway 52.

When the servo motor 42 has projected the plug 30 into the outlet 20, the contact between sheath 32 and outlet 20 stops the forward motion of the sheath 32. However, as the servo motor 42 continues to project the plug 30 forward, a male electrical connector 31 (shown in FIG. 2) projects beyond the sheath 32 and is forced into a female electrical connector 21 (shown in FIG. 6). A clutch 41 disengages the gearbox 44 when a significant physical resistance to the projection of the plug 30 occurs, causing the plug 30 to stop projecting and preventing damage to the plug 30, gearbox 44, and servo motor 42. Thus, the clutch 31 stops projecting the plug 30 when the plug 30 is seated within the outlet 20.

The docker 60 detects an electrical connection after the servo motor 42 halts movement by sensing the change in impedance between the male connector 31 and the sheath 32. If an electrical connection exists, the docker 60 transmits a code identifying the vehicle through the plug 30 and outlet 20 to the power controller 70. The code is preferably the vehicle identification number (VIN) or any other unique, manufacturer-supplied code. In addition, the code may contain recharging parameters, such as current requirements, to be used by the power controller 70 to optimize the recharging procedure. The power controller 70 retransmits the received code back to the docker 60 through the outlet 20 and plug 30. If the docker 60 receives the same code it transmitted then the electrical connection is complete and the docker 60 transmits an acknowledgement signal through the plug 30 and outlet 20 to the power controller 70. If the docker 60 did not receive the same code it transmitted then it causes the servo motor 42 to remove the plug 30 from the outlet 20 and attempt to reinsert the plug 30 into the outlet. The power controller detects the removal of plug 30 from outlet 20 by sensing the change in impedance across the outlet 20 and, consequently resets. If the docker 60 fails to establish a connection after three attempts the docker alerts the vehicle operator that recharging did not occur.

Upon receiving the acknowledgement signal from the docker 60, the power controller 70 determines whether the vehicle is authorized to obtain electricity from the docking station 50. The power controller 70 may authorize any vehicle to use the docking station 50 or may limit use to a specific list of vehicles. If the vehicle is authorized, then the power controller 70 transmits an acknowledgement signal through outlet 20 and plug 30 to the docker 60. The power controller then causes electricity to be supplied to the outlet 20. If the vehicle is not authorized, the power controller 70 transmits a nonacknowledgement signal through the outlet 20 and plug 30 to the docker 60 and does not supply electricity to the outlet.

Upon receiving an acknowledgement signal from the power controller 70, the docker 60 performs any necessary switching to permit the receipt of AC electricity. Upon receiving a nonacknowledgement signal from the power controller 70, the docker 60 instructs the servo motor 42 to disconnect the plug 30 from the outlet 20 and return the plug 30 to the secure position. In either event, the docker 60 signals the vehicle operator of the success or failure of the authorization.

Figure 2:
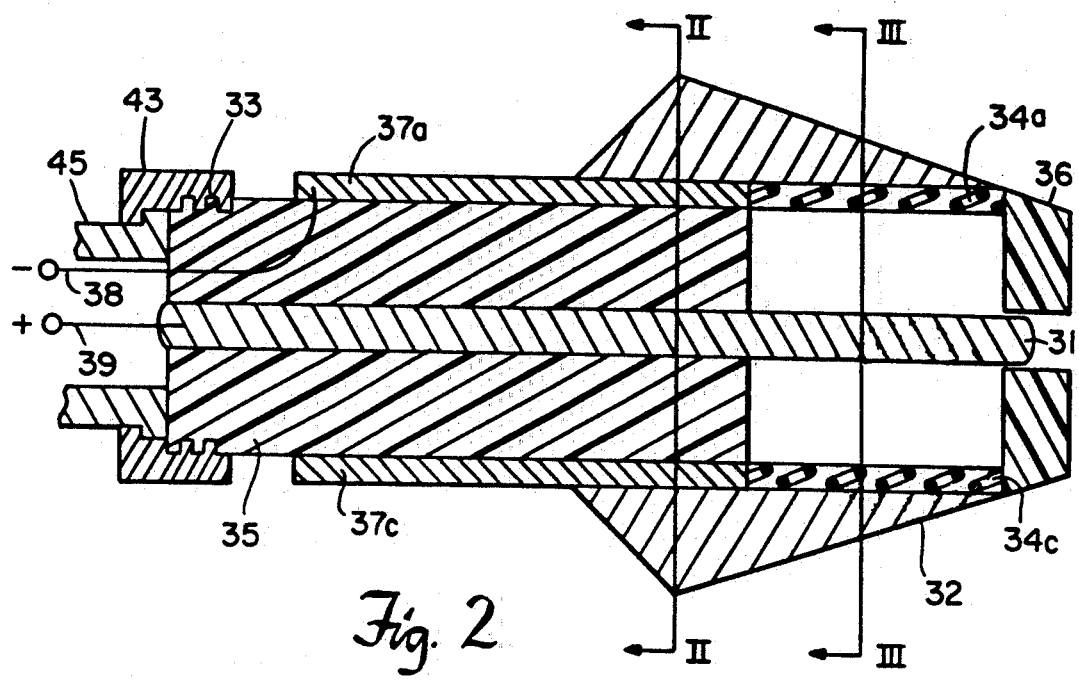
FIG. 2 is a schematic sectional view of electrical plug 30 of FIG. 1.

FIG. 2 shows the structure of the plug 30 in detail. Male connector 31 is a standard BNC-type connector encased in a plastic housing 35. A metallic protective sheath 32 and insulating plastic endpiece 36 encase the distal end of the plug housing 35 and protect the male connector 31 from damage. The forward force of the plug 30 causes the male connector 31 to project beyond the endpiece 36 by compressing springs 34a, 34c and sliding the sheath 32 along conductive metal rails 37a, 37c. Conductive wires 38,39 carry the electric current from the plug to the recharger 15. Wire 39 carries the positive current and is connected to male connector 31. Wire 38 carries the negative current and is connected to at least one rail 37a in contact with the sheath 32. The wires 38,39 exit the proximal end of the plastic housing 35. Retaining collar 43 attaches the proximal end of the plastic housing 35 to the distal end of the arm 45 by mating with the housing threads 33.

Figure 3:
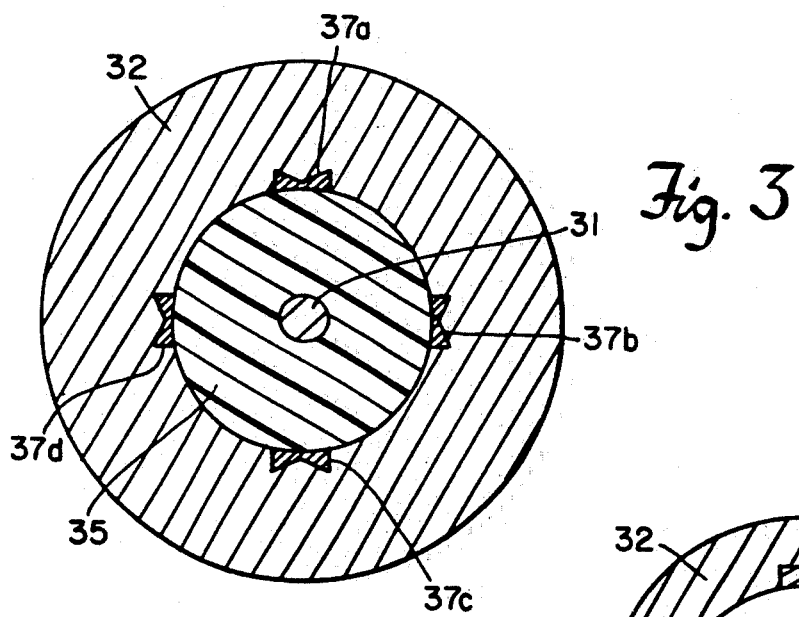
FIG. 3 is a section taken along lines II—II of the electrical plug 30 of FIG. 2.

FIG. 3 shows a section view of the plug 30 taken along line II—II of FIG. 2. In particular, the view shows the shape of the rails 37a-d. The rails 37a-d contain a wedge-shaped groove and the sheath 32 contains a matching wedge-shaped projection. Thus, the rails 37a-d operate as a track upon which the sheath 32 rides when retracted.

Figure 4:
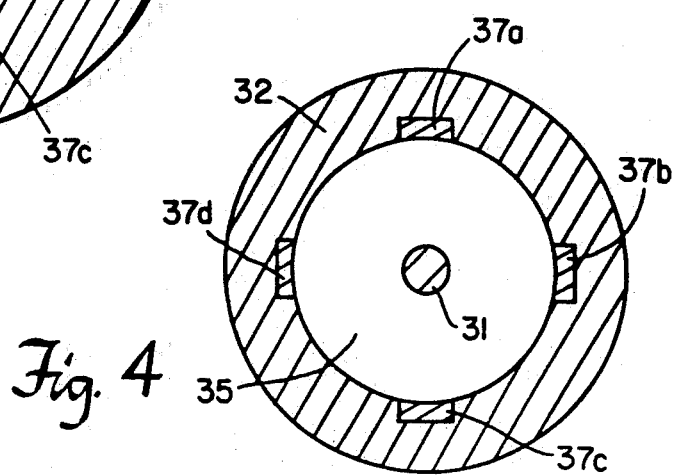
FIG. 4 is a section taken along lines III—III of the electrical plug 30 of FIG. 2.
Figure 5:
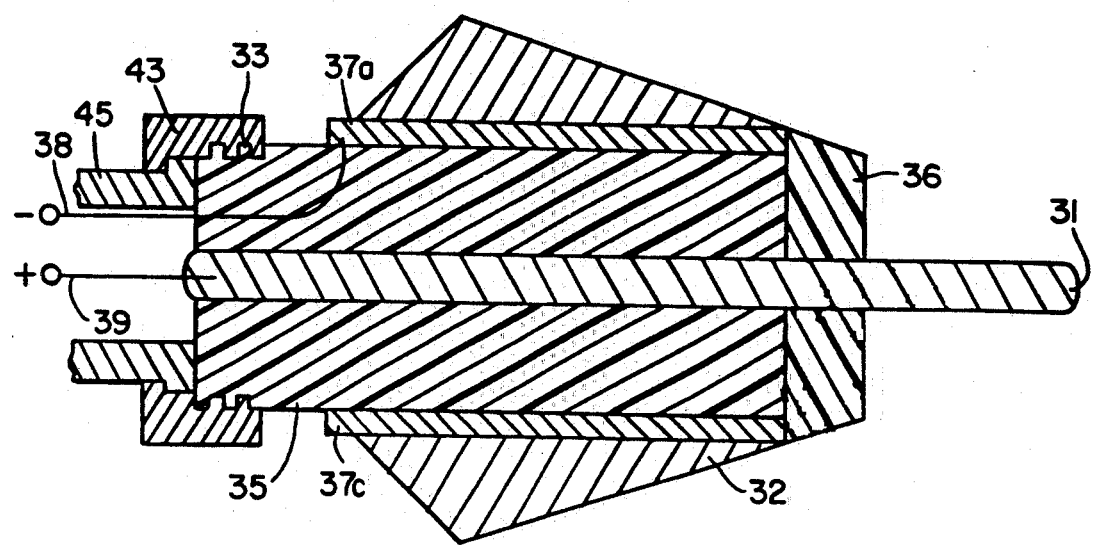
FIG. 5 is a schematic sectional view of electrical plug 30 of FIG. 1 with the protective sheath 32 retracted.

FIG. 4 shows a section view of the plug 30 taken along lines III—III of FIG. 2. For the sake of clarity, the springs 34a-d are excluded from FIG. 4. As seen from this view the rails 37a-d are rectangular-shaped without a wedge groove because the proximal ends of the rails 37a-d are capped to prevent the sheath 32 from detaching from the plug housing 35. This section of the sheath 32 has a matching rectangular-shaped channel. Thus, the sheath 32 can retract as shown in FIG. 5 because the sheath's 32 rectangular channel can move along the full length of the rails 37a-d. However, the section of sheath 32 with a wedge-shaped projection within the channel cannot move beyond the rectangular-shaped end of the rails 37a-d.

Figure 6:
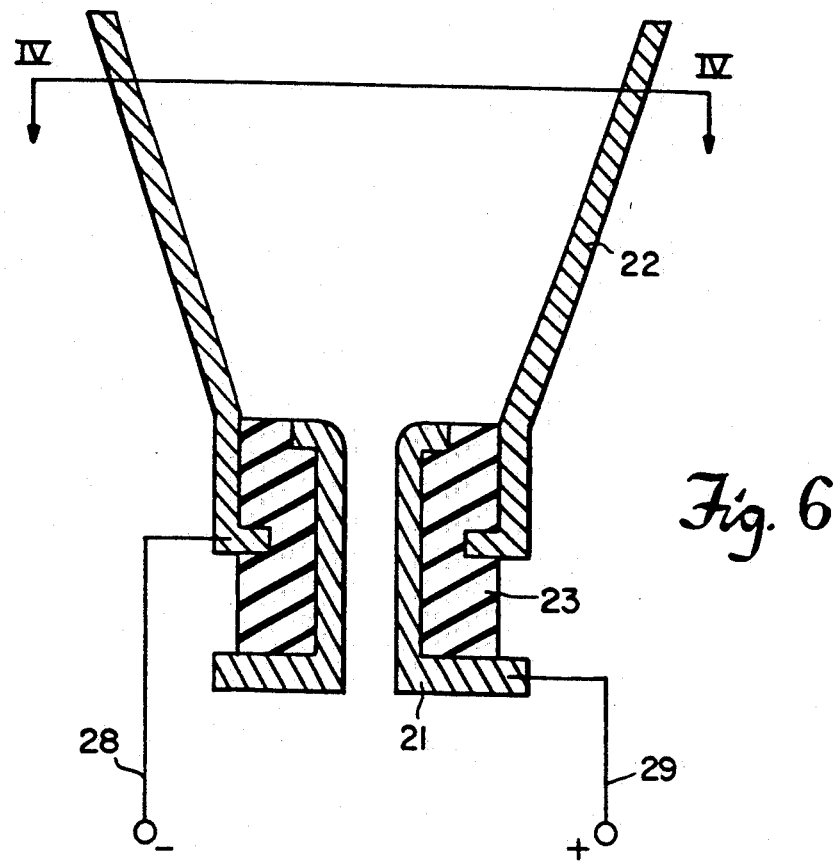
FIG. 6 is a schematic sectional view of electrical outlet 20 of FIG. 1.
Figure 7:
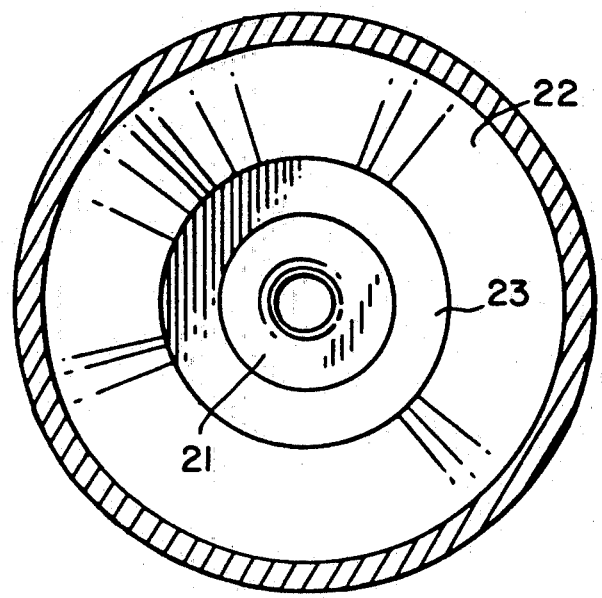
FIG. 7 is a section taken along lines IV—IV of the electrical outlet 20 of FIG. 6.

The structure of the outlet 20 is shown in FIG. 6. Positive current is supplied through conducting wire 29 to the metallic female connector 21. The female connector 21 is encased within an electrical insulating divider 23. Negative current is supplied through conducting wire 28 to the metallic outlet wall 22. The wall 22 is separated from the connector 21 by the insulating divider 23. The wall 22 is shaped to match the plug sheath 32. FIG. 7 shows the section view along line IV—IV of FIG. 6.

Figure 8A:
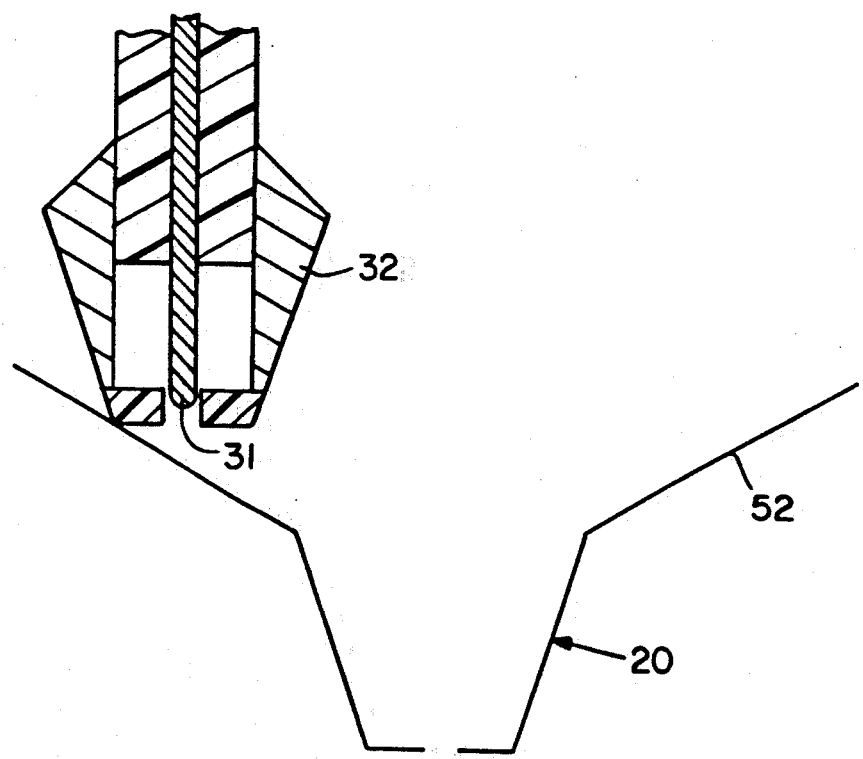
FIGS. 8a-8c show a view of the docking function.
Figure 8B:
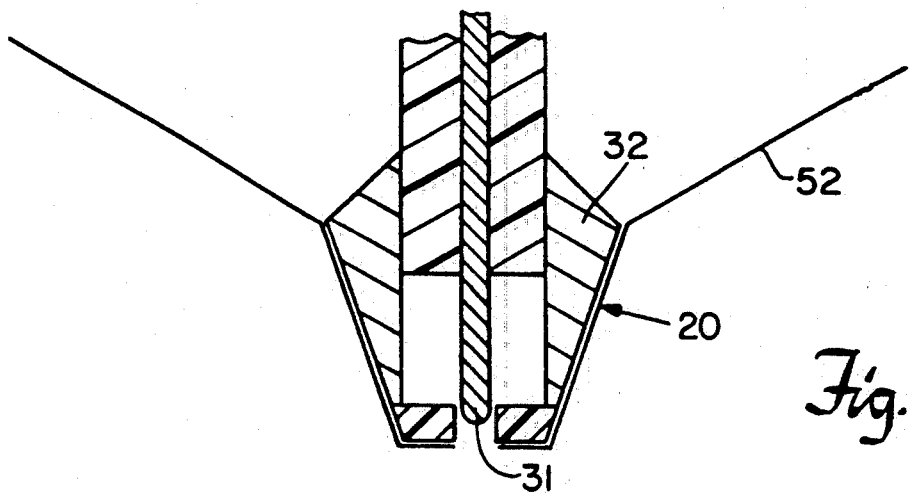
Figure 8C:
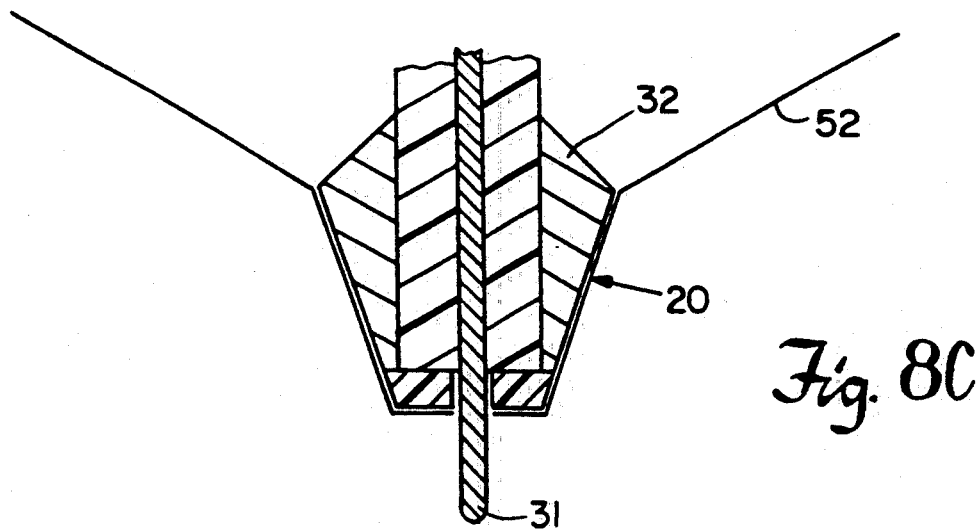

FIGS. 8a–8c the process of connecting the plug 30 to the outlet 20. In FIG. 8A, a plug makes contact with the passageway 52. Further pressure on the plug causes motion toward the outlet 20. FIG. 8B shows the plug funneled into position directly aligned with the outlet. Further force pushes the plug into the matching outlet. FIG. 8C shows the plug 30 engaging the outlet 20. To disconnect, the plug is pulled straight out of the outlet.

Figure 9:
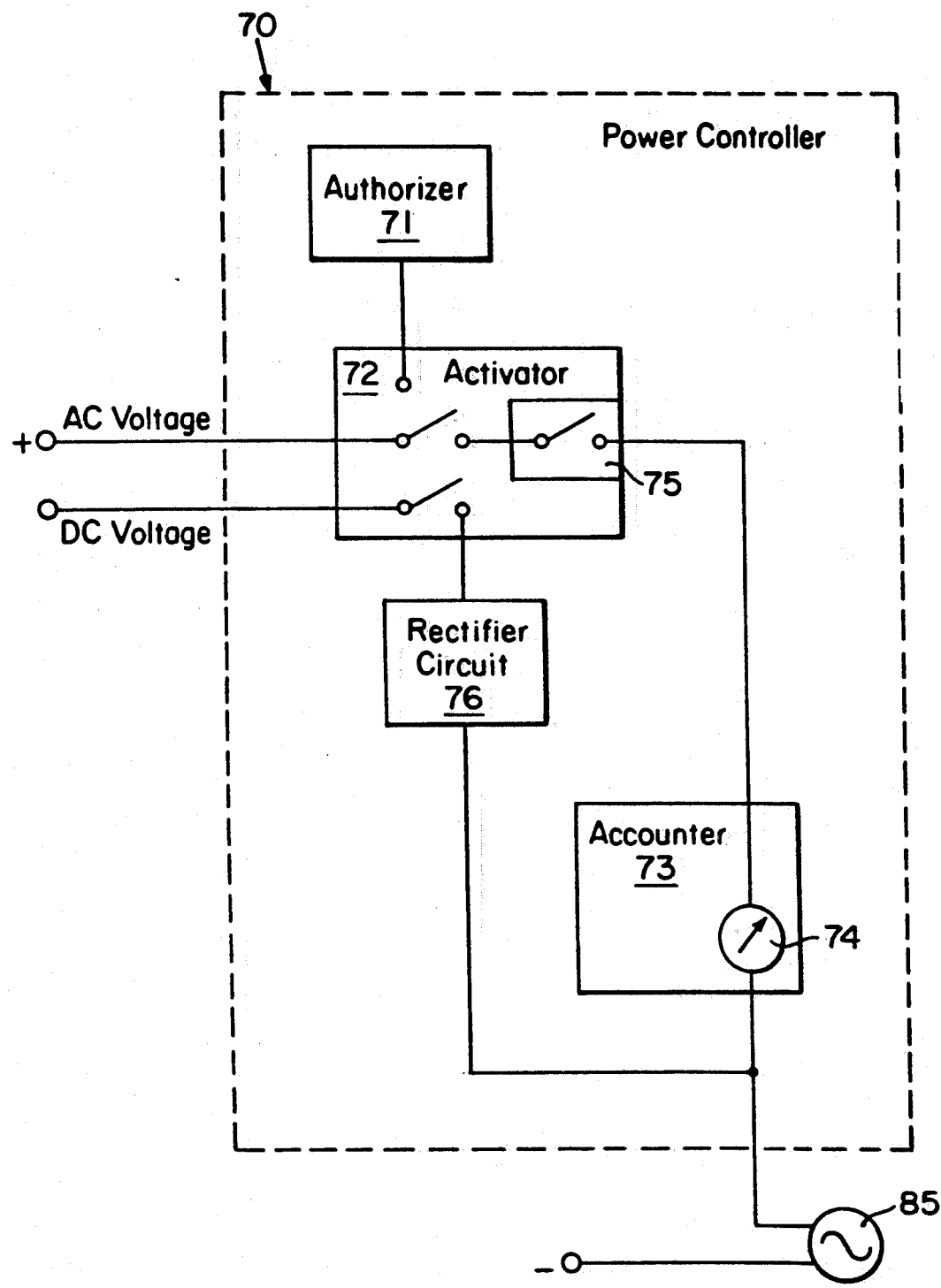
FIG. 9 is a block diagram of the power controller 70 of FIG. 1.

FIG. 9 shows the structure of the power controller 70. AC power is supplied by a power source 85. To power the LED and internal electronics, the AC electricity is converted to DC electricity by rectifier circuit 76. The activator 72 passes DC electricity to the docking station LED 51 only if all components of power controller 70 are operational. Authorizer 71 establishes communications with the docker 60 through wire 29 connected to the outlet connector 21 and verifies the vehicle's identity. If the authorizer 71 identifies the vehicle, a signal is sent to the activator 72. Activator 72, in response to the signal from authorizer 71, energizes AC electricity to the plug 20. The activator 72 contains a Ground Fault Interrupt (GFI) circuit breaker 75 to shut off the electric supply to outlet 20 if a current spike occurs. The current flows through accounter 73 and meter 74. The meter 74 monitors the energy used by the vehicle. Accounter 73 notes the energy usage by the charging vehicle for accounting and billing purposes. While the vehicle is recharging, the current flow through meter 74 and accounter 73 drops as the recharger 15 restores the batteries' electrical charge. Upon removal of the plug 30 from the outlet 20, the current flow becomes zero. When accounter 73 detects a drop in energy usage below a predetermined level, the accounter 73 signals the activator 72 to disconnect the power. The predetermined level may be computed based on the recharging parameters transmitted by the docker 60 or may default to a standard value.

Although the invention has been particularly shown and described with reference to a preferred embodiment thereof, it will be understood by those skilled in the art that various changes in form and details may be made therein without departing from the spirit and scope of the invention as defined by the appended claims.

As described, the invention supplies AC electricity through outlet 20 to be compatible with currently produced electric vehicles, which are equipped with vehicle specific rechargers. However, an alternative embodiment could supply either AC or DC electricity by including a recharger as part of power controller 80. A remote recharger would be desirable if manufacturers cease equipping electric vehicles with rechargers. The recharging parameters transmitted from the vehicle to the power controller may contain DC power requirements. The power controller could then supply the vehicle-specific DC voltage and current to the vehicle.

The invention has been described relative to a battery-powered vehicle, however the invention has applications beyond that use. The invention is also useful for gasoline and diesel vehicles as well. These vehicles could use the docking station to recharge their batteries or to supply electricity while the engine is off. Thus, a parked vehicle could operate ventilation and cooling systems using electricity supplied by the docking station.

In the curb configuration, the outlet need not be located at a known height, Z2, above the road surface. For example, the outlet opening may be configured parallel to the docking station face (i.e. the outlet's axis is perpendicular to the face). In that case, the arm and plug would be projected at an angle perpendicular to the docking station face. Similarly, an in-ground docking station in which the passageway 52 is below the ground may be desirable.

The LED need not be positioned so light projects through the opening in the female connector. The LED could be configured on the face side of the female connector. For example, the LED could be built into the outlet on the face side of the insulating divider 23 without affecting the operation of the docker.

For simplicity, the LED has been described as generating blue light. However, the LED need not generate a single peak frequency response. The LED could generate an easily distinguishable signature comprising several frequency peaks. Only one of the generated wavelengths need be in the visible light spectrum.

Although the power controller is shown to be physically separate from the docking station, it need not be. While that embodiment is appropriate for a network of docking stations, a home unit could have all power controller features integrated into the docking station. In any event, some features might be more conveniently located within the docking station.

A particular power controller may not require all the above-mentioned features. For example, the power controller could be operated by a coin operated meter. In that case, all properly connected vehicles would be automatically authorized and recharging would stop when the coin meter expires.

I claim:

1. For a vehicle equipped with at least one electrical component, an electrical power coupling system for supplying electricity from a power supply to the vehicle comprising:
   a) a first power coupler attached to the vehicle and coupled to the electrical component;
   b) an arm mechanism attached to the vehicle and to which the first coupler is attached, the arm mechanism being movable in a multi-dimensional zone of motion relative to the vehicle;
   c) a second power coupler remote from the vehicle and coupled to the power supply, the second coupler being located at an arbitrary position within the multi-dimensional zone of motion;
   d) an indicator remote from the vehicle for indicating the location of the second coupler with respect to the vehicle; and
   e) a locator attached to the vehicle for seeking and locating the second coupler based on the indication from the indicator to enable coupling of the first coupler to the second coupler by translating the arm mechanism within the multi-dimensional zone of motion.

2. The coupling system of claim 1 wherein the indicator comprises a homing beacon for generating signals indicating the location of the second coupler.

3. The coupling system of claim 1 wherein the electrical component comprises a rechargeable battery.

4. The coupling system of claim 3 further comprising a recharger for recharging the battery, the recharger electrically coupled between the battery and the first coupler.

5. The coupling system of claim 1 wherein the first coupler is a plug and the second coupler is an outlet.

6. The coupling system of claim 1 wherein the multi-dimensional zone of motion is defined by a first axis extending longitudinally relative to the vehicle, a second axis extending laterally relative to the vehicle, and a third axis extending normal to the underbody of the vehicle.

7. For a battery-powered vehicle including a rechargeable battery, a charging system for supplying electricity to the vehicle battery comprising:
   a) an arm mechanism attached to the vehicle and moveable in a multi-dimensional zone of motion relative to the vehicle, the arm mechanism having a distal end with an electrical plug at the distal end, the plug being electrically coupled to the battery;
   b) a docking station located remote from the vehicle within the multi-dimensional zone of motion, the docking station containing an electrical outlet electrically coupled to an electrical power supply and an outlet homing beacon which generates signals indicating the location of the outlet;
   c) a docker attached to the vehicle and in electrical communication with the arm mechanism for automatically coupling the plug to the outlet in response to the signals; and
   d) a power controller in electrical communication with the docking station for the outlet and the power supply.

8. The charging system of claim 7, wherein the plug is encased within a retractable protective sheath.

9. The charging system of claim 7, wherein angular displacement of the arm mechanism relative to the edge of the vehicle is moveable substantially within 0 to 180 degrees.

10. The charging system of claim 7, wherein the arm mechanism retracts to a secure position while not activated.

11. The charging system of claim 7, wherein the outlet homing beacon comprises an LED, which emits light with a frequency response that is distinguishable from background light.

12. The charging system 7, wherein the docking station includes a conical passageway for guiding the plug to the outlet.

13. The charging system of claim 7, wherein the docker includes at least one sensor, a processor, a memory, and software instructions residing in the memory and executed by the processor.

14. The charging system 13, wherein the at least one docker sensor is tuned to distinguish the outlet homing beacon signals from background signals.

15. The charging system of claim 13, wherein the software instructions calculate the approximate position of the outlet, translate the plug to the outlet, detect a connection with the outlet and establish a communication link with the docking station.

16. The charging system of claim 7, wherein the power controller comprises a processor, a memory, and software instructions residing in the memory and executed by the processor.

17. The charging system of claim 16 further comprising an authorizer for establishing a communications link with the docker and determining whether the vehicle is authorized for recharging.

18. The charging system of claim 17 further comprising an activator for connecting and disconnecting the power supply to the outlet.

19. The charging system of claim 18 further comprising an accounter for determining the amount of energy used by the vehicle.

20. The charging system of claim 19 further comprising a meter for measuring power usage by the vehicle during the recharging of the battery.

21. The charging system of claim 7 further comprising a recharger for recharging the battery, the recharger electrically coupled between the battery and the plug.

22. For a battery-powered vehicle including a recharger for recharging a rechargeable battery, a charging system for supplying electricity to the recharger comprising:
   a) an arm mechanism attached to the vehicle and having a distal end, the arm mechanism being movable relative to the vehicle, the arm mechanism containing an electrical plug electrically coupled to the recharger and encased within a retractable protective sheath at the distal end, and the arm mechanism being retractable to a secure position when not active;

b) a docking station located remote from the vehicle, the docking station containing an electrical outlet electrically coupled to an electrical power supply and wherein the outlet is located at the focus of a substantially conical passageway leading from a face surface of the docking station, the docking station emitting light with a frequency response that is distinguishable from background light for guiding the plug to the outlet;

c) a docker attached to the vehicle and in electrical communication with the arm mechanism, containing at least one optical sensor tuned to the emitted light from the docking station, a first processor, a first memory, and first software instructions residing in the first memory and executed by the first processor, the first software instructions moving the arm mechanism to seek the emitted light, calculating the approximate position of the outlet, translating the arm mechanism to connect the plug to the outlet, and establishing a communication link with the docking station; and d) a power controller remote from the vehicle and in electrical communication with the docking station containing a second processor, a second memory, and second software instructions residing in the second memory and executed by the second processor, an authorizer for establishing a communication link with the docker and determining whether the vehicle is approved for recharging, an activator controlling the power supplied to the outlet, and a meter and accounter for measuring the energy used by the vehicle for billing purposes.

23. A method of providing electricity to an electrical component in a vehicle by automatically coupling a moveable first power coupler attached to the vehicle by an arm mechanism having a multi-dimensional zone of motion relative to the vehicle to a second power coupler located remote from the vehicle, comprising the steps of:

a) in a docking station where the second coupler is located, generating an indicator signal;

b) positioning the vehicle such that the second coupler is located within the multi-dimensional zone of motion of the arm mechanism; and c) in the vehicle,
 i) sensing the indicator signal generated by the docking station;
 ii) locating the approximate position of the second coupler by analyzing the indicator signal; and
 iii) translating the arm mechanism within the multi-dimensional zone of motion relative to the vehicle and urging the first coupler to couple with the second coupler.

24. The method of claim 23 wherein the first coupler is a plug and the second coupler is an outlet.

25. The method of claim 23 wherein the step of translating is within a three-dimensional zone of motion relative to the vehicle.

26. A method of recharging a battery-powered vehicle equipped with a rechargeable battery, comprising the steps of:

a) automatically coupling an in-vehicle electrical plug attached to a moveable arm mechanism having a multi-dimensional zone of motion relative to the vehicle to an electrical outlet attached to a remote docking station in response to signals generated by the docking station; and b) electrically connecting the outlet to a power source.

27. The method of claim 26 further comprising projecting the plug from a protective sheath.

28. The method of claim 26 further comprising directing the vehicle's arm mechanism to the outlet in response to a homing beacon.

29. The method of claim 28 wherein the directing step is in response to light waves generated by the docking station.

30. The method of claim 26 further comprising funnelling the plug into the outlet.

31. The method of claim 30 further comprising retracting a protective sheath to expose the plug.

32. The method of claim 20 further comprising detecting the coupling between the plug and the outlet and establishing a communication link between the vehicle and the docking station.

33. The method of claim 32 further comprising authenticating the vehicle for recharging at the docking station.

34. The method of claim 33 further comprising measuring the energy used by the vehicle.

35. The method of claim 33 wherein the step of authenticating is based on a unique identification code.

36. The method of claim 35 wherein the unique identification code is a Vehicle Identification Number.

37. For a battery-powered vehicle including a rechargeable battery, a charging system for supplying electricity to the vehicle battery comprising:

a) an arm mechanism attached to the vehicle and moveable relative to the vehicle, the arm mechanism having a distal end with an electrical plug at the distal end, the plug being electrically coupled to the battery and wherein the arm mechanism is retracted to a secure protected position when not activated;

b) a docking station located remote from the vehicle, the docking station containing an electrical outlet electrically coupled to an electrical power supply and an outlet homing beacon which generates signals indicating the location of the outlet;

c) a docker attached to the vehicle and in electrical communication with the arm mechanism for activating the arm mechanism and automatically coupling the plug to the outlet in response to the signals; and d) a power controller in electrical communication with the docking station for electrically connecting the outlet and the power supply.

38. For a battery-powered vehicle including a rechargeable battery, a charging system for supplying electricity to the vehicle battery comprising:

a) an arm mechanism attached to the vehicle and moveable relative to the vehicle, the arm mechanism having a distal end with an electrical plug at the distal end, the plug being electrically coupled to the battery;

b) a docking station located remote from the vehicle, the docking station containing an electrical outlet electrically coupled to an electrical power supply and an outlet homing beacon which generates signals indicating the location of the outlet;

c) a docker attached to the vehicle and in electrical communication with the arm mechanism for automatically coupling the plug to the outlet in response to the signals, the docker including at least one sensor, a processor, a memory, and software instructions residing in the memory and executed by the processor; and
d) a power controller in electrical communication with the docking station for electrically connecting the outlet and the power supply.

39. The charging system of claim 38, wherein the at least one docker sensor is tuned to distinguish the outlet homing beacon signals from background signals.

40. The charging system of claim 38, wherein the software instructions calculate the approximate position of the outlet, translate the plug to the outlet, detect a coupling between the plug and the outlet, and establish a communication link with the docking station.

41. For a battery-powered vehicle including a rechargeable battery, a charging system for supplying electricity to the vehicle battery comprising:
a) an arm mechanism attached to the vehicle and moveable relative to the vehicle, the arm mechanism having a distal end with an electrical plug at the distal end, the plug being electrically coupled to the battery;
b) a docking station located remote from the vehicle, the docking station containing an electrical outlet electrically coupled to an electrical power supply and an outlet homing beacon which generates signals indicating the location of the outlet;
c) a docker attached to the vehicle and in electrical communication with the arm mechanism for automatically coupling the plug to the outlet in response to the signals; and
d) a power controller in electrical communication with the docking station for electrically connecting the outlet and the power supply, the power controller comprising a processor, a memory, and software instructions residing in the memory and executed by the processor.

42. The charging system of claim 41 further comprising an authorizer for establishing a communications link with the docker and determining whether the vehicle is authorized for recharging.

43. The charging system of claim 42 further comprising an activator for connecting and disconnecting the power supply to the outlet.

44. The charging system of claim 43 further comprising an accounter for determining the amount of energy used by the vehicle.

45. The charging system of claim 44 further comprising a meter for measuring power usage by the vehicle during the recharging of the battery.

46. A method of recharging a battery-powered vehicle equipped with a rechargeable battery, comprising the steps of:
a) automatically seating an in-vehicle electrical plug attached to a moveable arm mechanism to an electrical outlet attached to a remote docking station in response to signals generated by the docking station;
b) directing the arm mechanism to the outlet in response to light waves generated by the docking station;
c) electrically connecting the outlet to a power source.

47. A method of recharging a battery-powered vehicle equipped with a rechargeable battery comprising the steps of:
a) automatically seating an in-vehicle electrical plug attached to a moveable arm mechanism to an electrical outlet attached to a remote docking station in response to signals generated by the docking station;
b) detecting the seating between the plug and the outlet;
c) establishing a communication link between the vehicle and the docking station; and
d) electrically connecting the outlet to a power source.

48. The method of claim 47 further comprising measuring the energy used by the vehicle.

49. The method of claim 47 further comprising the step of authenticating he vehicle for recharging at the docking station, the authenticating step occurring before the electrically connecting step.

50. The method of claim 49 wherein the step of authenticating is based on a unique identification code.

51. The method of claim 50 wherein the unique identification code is a Vehicle Identification Number.

* * * * *